United States Patent
Waeckerle et al.

(10) Patent No.: US 7,195,680 B2
(45) Date of Patent: Mar. 27, 2007

(54) SOFT MAGNETIC ALLOY FOR CLOCK-MAKING

(75) Inventors: Thierry Waeckerle, Nevers (FR); Hervë Fraisse, Nevers (FR); Bruno Boulogne, Sechoise (FR)

(73) Assignee: Imphy Alloys, Puteaux (FR)

( * ) Notice: Subject to any disclaimer, the term of this patent is extended or adjusted under 35 U.S.C. 154(b) by 271 days.

(21) Appl. No.: 10/502,946

(22) PCT Filed: Feb. 14, 2003

(86) PCT No.: PCT/FR03/00492

§ 371 (c)(1),
(2), (4) Date: Jul. 29, 2004

(87) PCT Pub. No.: WO03/069638

PCT Pub. Date: Aug. 21, 2003

(65) Prior Publication Data

US 2005/0161123 A1    Jul. 28, 2005

(30) Foreign Application Priority Data

Feb. 15, 2002  (FR) ................... 02 01900

(51) Int. Cl.
*H01F 1/147* (2006.01)
(52) U.S. Cl. ............... 148/315; 148/306; 148/307; 148/309; 148/310; 148/315; 420/94; 420/95; 420/96; 420/97; 420/98
(58) Field of Classification Search .............. None
See application file for complete search history.

(56) References Cited

U.S. PATENT DOCUMENTS

| | | | |
|---|---|---|---|
| 2,668,944 A | 2/1954 | Mitchel et al. | |
| 5,783,145 A | 7/1998 | Reydet et al. | |
| 6,190,465 B1 * | 2/2001 | Coutu et al. ............... | 148/315 |
| 6,350,324 B1 * | 2/2002 | Waeckerle et al. .......... | 148/311 |

FOREIGN PATENT DOCUMENTS

| | | |
|---|---|---|
| EP | 827 256 | 3/1998 |
| EP | 1 041 168 | 10/2000 |
| FR | 2 777 912 | 10/1999 |
| FR | 2 811 684 | 1/2002 |

OTHER PUBLICATIONS

Patent Abstracts of Japan, vol. 15, No. 263, Jul. 4, 1991 & JP 03 090545 (Aichi Steel Works Ltd.) Apr. 16, 1991.
Patent Abstracts of Japan, vol. 2000, No. 4, Aug. 31, 2000 & JP 2000 008148 (Daido Steel Co., Ltd; Tohoku Tokushuko KK; Jan. 11, 2000.

* cited by examiner

*Primary Examiner*—John P. Sheehan
(74) *Attorney, Agent, or Firm*—Sughrue Mion, PLLC

(57) ABSTRACT

The invention relates to a soft magnetic alloy with the following composition in wt. %: $28\% \leq Ni \leq 34\%$, $0\% \leq Co \leq 4\%$, $0\% \leq Cu \leq 4\%$, $1\% \leq Cr$, $0\% \leq Mo \leq 8\%$, $0\% \leq Nb \leq 1\%$, $0\% \leq Mn \leq 2\%$, $0\% \leq V \leq 5\%$, $0\% \leq W \leq 5\%$, $0\% \leq Si \leq 4\%$, $0\% \leq Al \leq 4\%$, $0\% \leq C \leq 0.4\%$, optionally one or several elements selected from magnesium and calcium the content of which is such as to remain below 0.1%, the rest being iron and impurities from production. The chemical composition furthermore satisfies the following relationships: $180.5 \leq 6 \times Ni  2.5 \times (Cr+Mo+V+W+Si+Al)+4 \times (Co+Cu) \leq 197.5$ et $Co+Cu \leq 4\%$. The invention relates to the use thereof for production of a stator for use in a motor for clock-making.

7 Claims, No Drawings

SOFT MAGNETIC ALLOY FOR CLOCK-MAKING

BACKGROUND OF THE INVENTION

The present invention relates to a soft magnetic alloy and to its use in a motor for watchmaking.

The hands of analog quartz watches are moved by a miniature electric motor known as Lavet-type stepper motor (see FIG. 1). This motor comprises a bipolar rotor 1 consisting of a permanent magnet, a stator 2 cut from a strip of soft magnetic alloy and a wound core 3 made of soft magnetic alloy possibly different from that of which the stator is made. The stator includes isthmuses 4 and 5 that have to be as narrow as possible.

To manufacture the stator of an electric motor for watchmaking, it is known to use soft magnetic alloys of the 80% nickel alloy type containing a few percent of molybdenum or copper, or of the Fe-36.5Ni-7.5Cr type alloy type or else of the Fe-50Ni-10Cr alloy type. These alloys have a coercive field of less than 100 mOe for thickness between 0.4 and 0.8 mm, within the temperature range from −20° C. to +70° C., and a saturation induction, $B_S$ of greater than 4000 gauss at 40° C. However, these alloys are expensive, and it is desirable to have a less expensive alloy. However, such an alloy is not known.

SUMMARY OF THE INVENTION

The object of the present invention is to propose a soft magnetic alloy suitable for the manufacture of an electric motor stator for watchmaking, which is less expensive than the known alloys.

For this purpose, the subject of the invention is a soft magnetic alloy, the composition of which comprises, in % by weight:

$28\% \leq Ni < 34\%$
$0\% \leq Co \leq 4\%$
$0\% \leq Cu \leq 4\%$
$1\% \leq Cr$
$0\% \leq Mo \leq 8\%$
$0\% \leq Nb < 1\%$
$0\% \leq Mn < 2\%$
$0\% \leq V < 5\%$
$0\% \leq W < 5\%$
$0\% \leq Si < 4\%$
$0\% \leq Al < 4\%$
$0\% \leq C \leq 4\%$ optionally, one or more elements taken from magnesium and calcium in contents such that their sum remains less than 0.1%, the balance being iron and impurities resulting from the melting, the chemical composition furthermore satisfying the relationships:

$$180.5 \leq 6Ni - 2.5(Cr+Mo+V+W+Si+Al) + 4(Co+Cu) \leq 197.5$$

and $$Co+Cu \leq 4\%.$$

Preferably, the alloy contains more than 2% chromium and preferably also contains more than 1.5%, or even more than 2%, molybdenum.

The invention also relates to an electric motor stator for watchmaking, made of an alloy according to the invention, and to the stator of such a motor.

DETAILED DESCRIPTION OF THE INVENTION

The invention will now be described in greater detail.

The alloy according to the invention contains, in % by weight:

between 28 and 34% nickel, element necessary for obtaining good magnetic properties, but very expensive however;

from 0% to 4% cobalt and/or copper, the sum of these two elements remaining less than or equal to 4%, in order to obtain good magnetic properties: these two elements have a significant and advantageous effect, like nickel, on the magnetic properties and allow the % Ni to be limited. In addition, copper is much less expensive than nickel;

at most 0.4% carbon in order not to degrade the magnetic properties;

at least 1%, and preferably more than 2%, chromium so as to obtain good corrosion resistance, but preferably less than 7.5%, and more particularly preferably less than 6.5%;

optionally up to 1% niobium in order to improve the mechanical properties;

optionally, molybdenum, vanadium, tungsten, silicon or aluminum, in amounts of less than 8% in the case of Mo, 5% in the case of V and W and 4% in the case of Si and Al, so as to increase the resistance and the magnetic performance (in particular the coercive field); preferably, the molybdenum content must be greater than 1.5%, or even 2%, so as to improve the mechanical properties and thus reduce the cross section of the isthmuses 4 and 5 (and therefore to increase the efficiency of the motor) while maintaining the same geometrical stability of the stator. Furthermore, a molybdenum content of greater than 1.5% prevents any inopportune coloration and/or oxidation during annealing in $NH_3$;

up to 2% manganese, in order to increase the hot convertibility and the magnetic performance; and optionally, one or more elements taken from magnesium and calcium in contents such that their sum remains less than 0.1%, so as to improve the mechanical cutability.

The balance of the composition consists of iron and impurities resulting from the melting. Among these impurities there may especially be titanium, which it is preferred to limit to less than 0.003%, preferably less than 0.002% and more particularly preferably less than 0.001% since it is deleterious to use in the field of watchmaking. This is because the present inventors have found that the presence of this element could substantially increase the coersive force after annealing, something which would not be desirable for these applications.

Furthermore, and so as to obtain magnetic properties allowing the manufacture of a miniature electric motor stator for watchmaking, i.e. a coercive field $H_C$ between −20° C. and +70° C. of less than 100 mOe and a saturation induction $B_S$ at 40° C., for an induction of 40 Oe, of greater than 4000 gauss, the chemical composition of the alloy must satisfy the condition:

$$180.5 \leq 6Ni - 2.5(Cr+Mo+V+W+Si+Al) + 4(Co+Cu) \leq 197.5.$$

Apart from the magnetic properties that have just been indicated, the alloy exhibits very good aqueous acid corrosion resistance. This corrosion resistance can be measured by measuring the maximum current $I_{max}$ that flows between an electrode made of the alloy and a reference electrode made of platinum which are immersed in an aqueous sulfuric acid solution which having a concentration of 0.01 mol/l when the voltage between the two electrodes is varied. With the composition defined above, the current $I_{max}$ remains less than 3 mA.

The alloy may be melted by any known means, for example in an induction furnace or in a submerged arc furnace, and then, after solidification, it may be hot-rolled and cold-rolled in order to obtain, for example, a strip from which parts are cut which are annealed, for example either statically between 1100° C. and 1200° C. for 1 to 10 hours in a reducing atmosphere (for example in hydrogen), or on the run between 1000° C. and 1100° C. for 5 to 30 minutes, in a reducing atmosphere.

By way of example and comparison, the alloys whose composition and mechanical properties are given in Table 1 were produced.

Examples 2, 3, 5 to 7, 9, 10 and 14 to 15 correspond to the invention. Examples 1, 4, 8, 11 to 13 and 18 to 20 are given by way of comparison. In these examples, the balance of the composition is iron and impurities.

For these examples, the alloy was melted by vacuum induction melting and cast in the form of ingots, which were forged between 1000° C. and 1200° C. and hot-rolled between 1150° C. and 800° C. in order to obtain strip products 4.5 mm in thickness. These strip products were pickled, cold-rolled down to a thickness of 0.6 mm without intermediate annealing and then cut into roundels of 36 and 25 mm diameter which were annealed at 1170° C. for 4 hours in hydrogen.

The coercive field $H_C$ at −20° C. and +70° C., the saturation induction $B_S$ at 40° C. in a field of 40 oersteds, and the maximum corrosion current $I_{max}$ in an aqueous sulfuric acid solution containing 0.01 mol/l where then measured.

In particular, in the case of the counter examples 1, 4, and 8, the nickel, cobalt, copper and chromium contents are such that 6Ni−2.5X+4(Co+Cu)>197.5 and, under these conditions, $H_C$ at 20° C. is greater than 100 mOe.

In the case of counter examples 11, 12, and 20, the nickel, cobalt, copper and chromium contents are such that 6Ni−2.5X+4(Co+Cu)<180.5 and, under these conditions, $B_S$ is less than 4000 gauss.

In the case of counter examples 18 and 19, the chromium contents are too low and $I_{max}$ is greater than 3 mA, which corresponds to insufficient corrosion resistance.

The following examples of alloys more particularly well suited to the manufacture of stators for watch motors were produced:

1. Fe-Ni33.7-Cr8-Mn0.3 alloy, contains about 33.7% nickel, 80% chromium and 0.30% manganese, the balance being iron and impurities resulting from the melting. Roundels were produced from this alloy under the same conditions as for the previous examples. The properties obtained were:

$B_S$=4500 G; $H_C$=26 mOe at −20° C. and 9.5 mOe at 70° C.; $I_{max}$=0.6 MA.

This inexpensive alloy has the advantage of containing neither copper nor cobalt, which makes it easier to recycle the scrap;

2. Fe—Ni33.8-Cr2-Mo6-Mn0.3 alloy, which contains about 33.8% nickel, 2% chromium, 6% molybdenum and 0.3% manganese, the balance being iron and impurities. The properties obtained, under the same conditions as for the previous examples, were:

$B_S$=4200 G; $H_C$=38 mOe at −20° C. and 15 mOe at 70° C.; $I_{max}$=1.6 mA.

This inexpensive alloy has a 20% higher mechanical strength (increase in maximum strength of 80 MPa after annealing at 1170° C.) compared with the previous example containing no molybdenum,

TABLE 1

| No. | Ni | Cr | Mn | Co | Mo | Cu | Nb | C | 6Ni − 2.5X + 4(Co + Cu) * | $H_c$ (in mOe) −20° C. | $H_c$ (in mOe) 70° C. | $B_s$ (in G) at 40° C. | $I_{max}$ (mA) | |
|---|---|---|---|---|---|---|---|---|---|---|---|---|---|---|
| 2  | 33.46 | 4.88 | 0.133 | 0.014 | 0.014 | 0.01 | <0.01 | 0.0066 | 188.62 | 59.5  | 26   | 6950 | 0.50 | inv  |
| 3  | 33.66 | 7.95 | 0.188 | 0.01  | 0.01  | 0.01 | <0.01 | 0.0041 | 182.14 | 26    | 9.5  | 4500 | 0.60 | inv  |
| 5  | 33.7  | 8    | 0.187 | 2.07  | 0.01  | 0.01 | <0.01 | 0.0066 | 190.50 | 56    | 18   | 5950 | 0.65 | inv  |
| 6  | 33.8  | 8.23 | 0.192 | 2.06  | 0.01  | 0.01 | 0.2   | 0.0070 | 190.48 | 43.5  | 13.5 | 5500 | 0.70 | inv  |
| 7  | 33.94 | 2.01 | 0.172 | 0.026 | 5.79  | 0.01 | <0.01 | 0.0074 | 184.28 | 37    | 13   | 4600 | 1.60 | inv  |
| 9  | 31.84 | 8.23 | 0.174 | 3.07  | 0.01  | 0.01 | <0.01 | 0.0150 | 182.76 | 23.5  | 7    | 4700 | 0.70 | inv  |
| 10 | 33.55 | 8.17 | 0.172 | 0.014 | 0.01  | 0.01 | <0.01 | 0.0160 | 180.95 | 14.5  | 5.5  | 4150 | 0.70 | inv  |
| 14 | 33.78 | 2.02 | 0.186 | 0.01  | 2.03  | 0.01 | <0.01 | 0.0150 | 192.64 | 39.5  | 19   | 7350 | 1.60 | inv  |
| 15 | 33.78 | 1.02 | 0.183 | 0.01  | 1.21  | 0.01 | <0.01 | 0.0130 | 197.19 | 42.5  | 24   | 8150 | 2.50 | inv  |
| 16 | 31.68 | 8.03 | 0.176 | 0.01  | 0.027 | 2.97 | <0.01 | 0.0120 | 181.86 | 42    | 13   | 4700 | 0.65 | inv  |
| 17 | 30.14 | 2.09 | 0.193 | 0.01  | 0.01  | 2.99 | <0.01 | 0.0130 | 187.59 | 43    | 21   | 6550 | 1.60 | inv  |
| 1  | 33.96 | 2.64 | 0.259 | 1.96  | 0.01  | 0.01 | <0.01 | 0.0089 | 205.02 | 120   | 58   | 9800 | 1.20 | comp |
| 4  | 33.83 | 5.1  | 0.152 | 2.02  | 0.01  | 0.01 | <0.01 | 0.0067 | 198.33 | 107   | 34.5 | 8400 | 0.50 | comp |
| 8  | 32.29 | 1.87 | 0.166 | 0.01  | 0.082 | 3.92 | <0.01 | 0.0083 | 204.58 | 108.5 | 44.5 | 9650 | 1.70 | comp |
| 11 | 31.84 | 8.2  | 0.173 | 0.011 | 0.01  | 0.01 | <0.01 | 0.0150 | 170.60 | 12    | —    | 500  | 0.70 | comp |
| 12 | 30.09 | 2.06 | 0.162 | 0.007 | 0.01  | 0.01 | <0.01 | 0.0140 | 175.43 | 31.5  | —    | 300  | 1.60 | comp |
| 18 | 32.2  | 0.71 | 0.223 | 0.01  | 0.01  | 0.01 | <0.01 | 0.0130 | 191.48 | 38    | 22   | 8300 | 3.60 | comp |
| 19 | 30.5  | 0.42 | 0.195 | 0.01  | 1.63  | 2.2  | <0.01 | 0.0140 | 186.72 | 44    | 24   | 6800 | 4.10 | comp |
| 20 | 30.9  | 8.95 | 0.177 | 0.01  | 0.01  | 3.9  | <0.01 | 0.0130 | 178.64 | 35    | 11   | 3500 | 0.90 | comp |

* In the formula, 6Ni − 2.5X + 4(Co + Cu), X = Cr + Mo + V + W + Si + Al.

These examples show that in the compositional field corresponding to the invention, the alloy satisfies the conditions required for manufacturing an electric motor stator for a watch, namely $H_C$<100 mOe between −20° C. and +70° C., $B_S$>4000 G and $I_{max}$<3 mA, whereas outside this range these conditions are not satisfied.

thereby making it possible to produce stators with narrower isthmuses and reduced magnetic losses (and therefore stepping motors of higher efficiency or a lower battery consumption by the watch);

3. Fe—Ni33.5-Cr5-Mn0.3 alloy, containing about 33.7% nickel, 8% chromium and 0.3% manganese, the balance being iron and impurities resulting from the smelting. Roundels were produced from this alloy under the same conditions as for the previous examples. The properties obtained were:
$B_S$=6950 G; $H_C$=59.5 mOe at −20° C. and 26 mOe at 70° C.; $I_{max}$=0.5 mA.

This inexpensive alloy has the advantage of having a high saturation induction $B_S$, allowing it to be used instead of alloys of the Fe—Ni80 type without having to redesign the motors; and 4. Fe—Ni30-Cr2-Cu3.7-Mn0.2 alloy, which contains about 30% nickel, 2% chromium, 3.7% copper and 0.2% manganese, the balance being iron and impurities. The properties obtained, under the same conditions as for the previous examples, were:
$B_S$=7400 G; $H_C$=45 mOe at −20° C. and 24 mOe at 70° C.; $I_{max}$=1.6 MA.

This alloy, which is particularly inexpensive since it contains only 30% nickel and about 4% copper, can, owing to its magnetic properties, substitute for any known alloy of the prior art without having to redesign the motors.

The invention claimed is:

1. A soft magnetic alloy, the composition of which comprises, in % by weight:
28%≦Ni<34%
0%≦Co≦4%
0%≦Cu≦4%
1%≦Cr
1.5%≦Mo≦8%
0%≦Nb<1%
0%≦Mn<2%
0%≦V<5%
0%≦W<5%
0%≦Si<4%
0%≦Al<4%
0%≦C≦4% optionally, one or more elements taken from magnesium and calcium in contents such that their sum remains less than 0.1%, the balance being iron and impurities resulting from melting, the chemical composition furthermore satisfying the relationships:

180.5≦6Ni−2.5(Cr+Mo+V+W+Si+Al)+4(Co+Cu)≦197.5 and

Co+Cu<4%.

2. The alloy as claimed in claim 1, the composition of which is furthermore such that:

Cr≧2%.

3. The alloy as claimed in claim 1, characterized furthermore in that:

Cr≦7.5%.

4. The alloy as claimed in claim 1, characterized furthermore in that it contains less than 0.003% titanium.

5. The alloy as claimed in claim 4, characterized furthermore in that it contains less than 0.002% titanium.

6. An electric motor for watchmaking, the stator of which consists of a soft magnetic alloy as claimed in claim 1.

7. An electric motor stator for watchmaking, consisting of a soft magnetic alloy as claimed in claim 1.

* * * * *